July 24, 1951 F. A. KOESTER 2,561,578
RADIATOR FILLING FAUCET
Filed Oct. 18, 1948
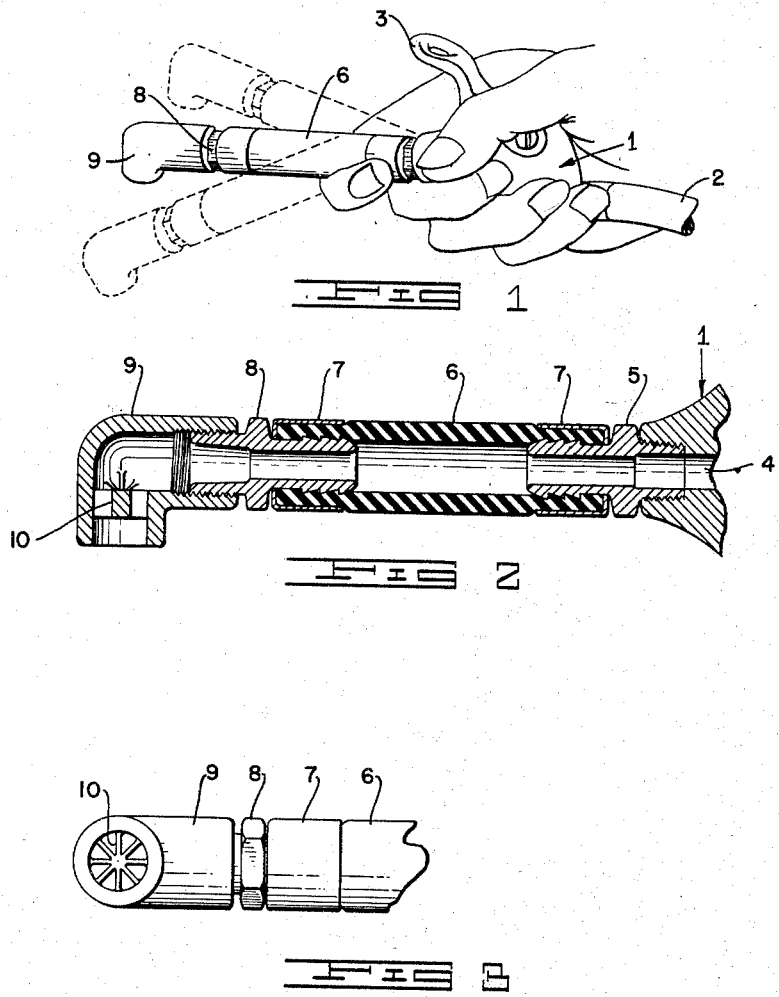
INVENTOR.
FREDERICK A. KOESTER
BY
*Lyon & Lyon*
ATTORNEYS Patented July 24, 1951

2,561,578

UNITED STATES PATENT OFFICE 2,561,578

RADIATOR FILLING FAUCET

Frederick A. Koester, Los Angeles, Calif.

Application October 18, 1948, Serial No. 55,048

3 Claims. (Cl. 222—192)

My invention relates to automobile radiator filling faucets commonly known as "radiator bibbs."

Included in the objects of my invention are:

First, to provide a device of this class wherein the valve body and nozzle unit are separated by a yieldable and resilient connecting member whereby the connecting member may be flexed to reciprocate the nozzle unit so that the nozzle unit may be employed as a hammer or hook member to knock, jar or pull loose a radiator cap, particularly when the radiator is excessively hot.

Second, to provide a device of this class which incorporates a special internally reinforced nozzle unit intended to withstand impacts incidental to its use.

Third, to provide a device of this class wherein the valve body is protected from impacts or blows received by the nozzle unit by reason of an intervening resilient connection.

With the above and other objects in view as may appear hereinafter, reference is directed to the accompanying drawings in which:

Figure 1 is a perspective view of my radiator bibb indicating by dotted lines the manner in which the nozzle may be reciprocated.

Figure 2 is an enlarged longitudinal sectional view of my device with the valve member shown fragmentarily.

Figure 3 is a fragmentary bottom view of my device showing particularly the nozzle element and the reinforcing therein.

My invention includes a valve unit 1 which may be conventional in form. One end of the valve unit is connected to a supply hose 2. The valve unit is equipped with a suitable handle 3 for controlling the valve (not shown). An outlet 4 is provided to which may be screwed an adapter fitting 5. The adapter fitting is provided with a stem which fits within the flexible section 6 formed of rubber or synthetic rubber. A ferrule 7 secures the rubber to the fitting 5. A similar fitting 8 connects the extended end of the flexible section 6 to a nozzle member 9.

The nozzle member 9 is L-shaped so that its discharge end is at right angles to the flexible section. In the discharge end there is formed a series of radiating integral reinforcing webs 10 which strengthen the extremity of the nozzle against collapse and also serve to reduce the tendency of the nozzle to drip when the water supply is cut off even though water may remain in the nozzle between the reinforcing ribs and the valve.

My radiator bibb is employed as follows:

In the event the radiator is overheated, the nozzle is employed as an impact tool or the lateral portion of the nozzle is employed as a hook to unfasten the cap. The flexible section enables the nozzle to be reciprocated by one's forefinger as indicated in Figure 1 so as to tap the radiator cap loose. The reinforcing ribs strengthen the nozzle and prevent such impact use of the nozzle from collapsing the nozzle.

While I have described the preferred embodiments of my invention, I am not limited to any of the details herein set forth except as described in the following claims.

I claim:

1. A device for removing automobile radiator caps and refilling automobile radiators, comprising: a valve unit attached to a hose line; a flexible discharge tube extending from said valve unit; a combined nozzle and impact member at the end of said discharge tube adapted to forceably engage a radiator cap to loosen the same and thereafter discharge water into the radiator, and internal web elements adjacent the discharge end of said nozzle and impact member to reinforce said member against impact and minimize dripping of water therefrom.

2. A device for removing automobile radiator caps and refilling automobile radiators, comprising: a valve unit attached to a hose line; a nonmetallic flexible discharge tube extending from said valve unit; and a combined nozzle and impact member of L-form adapted to hook over or strike a radiator cap to loosen the same and thereafter discharge water into the radiator.

3. A device as set forth in claim 2 wherein said nozzle is provided with integral internal web elements adjacent the discharge end thereof to reinforce said nozzle against impact and to minimize dripping of water from the nozzle.

FREDERICK A. KOESTER.

REFERENCES CITED

The following references are of record in the file of this patent:

UNITED STATES PATENTS

| Number | Name | Date |
|---|---|---|
| 743,622 | Daniels | Nov. 10, 1903 |
| 1,566,597 | Harman | Dec. 22, 1925 |
| 1,831,586 | Barr | Nov. 10, 1931 |
| 2,053,533 | Rizor | Sept. 8, 1936 |
| 2,134,709 | Drew | Nov. 1, 1938 |